(12) United States Patent
Garcarz et al.

(10) Patent No.: US 12,063,161 B1
(45) Date of Patent: Aug. 13, 2024

(54) DISCOVERING MULTI-APPLICATION WORKFLOWS TO IDENTIFY POTENTIAL QOE- IMPACTING ISSUES

(71) Applicant: Cisco Technology, Inc., San Jose, CA (US)

(72) Inventors: Michal Wladyslaw Garcarz, Cracow (PL); Pierre-André Savalle, Rueil-Malmaison (FR); Jean-Philippe Vasseur, Combloux (FR); Eduard Schornig, Haarlem (NL); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/204,166

(22) Filed: May 31, 2023

(51) Int. Cl.
*H04L 47/24* (2022.01)
*H04L 43/08* (2022.01)

(52) U.S. Cl.
CPC .............. *H04L 47/24* (2013.01); *H04L 43/08* (2013.01)

(58) Field of Classification Search
CPC ................................ H04L 47/24; H04L 43/08
See application file for complete search history.

(56) References Cited

U.S. PATENT DOCUMENTS

| | | | |
|---|---|---|---|
| 9,934,480 B2 | 4/2018 | Buth | |
| 10,880,191 B1* | 12/2020 | Kant | H04L 43/022 |
| 11,018,958 B2* | 5/2021 | Tapia | H04L 43/065 |
| 11,044,268 B2 | 6/2021 | Pastore et al. | |
| 11,297,660 B2* | 4/2022 | Li | H04W 76/10 |
| 11,336,506 B1* | 5/2022 | Li | H04N 21/2402 |
| 11,343,185 B2* | 5/2022 | Vysotsky | H04L 67/141 |
| 11,363,345 B2* | 6/2022 | Wang | H04N 21/44227 |
| 11,431,561 B2* | 8/2022 | Smith | H04L 9/3239 |
| 11,528,206 B2* | 12/2022 | Doraiswami | H04L 45/72 |
| 11,611,497 B1 | 3/2023 | Manikanta et al. | |
| 11,727,016 B1* | 8/2023 | Agarwal | G06F 16/2428 707/769 |
| 11,770,309 B2* | 9/2023 | Paruchuri | H04L 43/0835 370/236 |
| 11,824,784 B2* | 11/2023 | Keating | H04L 47/805 |
| 11,871,249 B2* | 1/2024 | Agarwal | H04W 24/04 |
| 11,894,969 B2* | 2/2024 | Barber | H04L 41/00 |

(Continued)

FOREIGN PATENT DOCUMENTS

| | | | | |
|---|---|---|---|---|
| CN | 111770028 A | * | 10/2020 | ......... H04L 41/5006 |
| CN | 115174424 A | * | 10/2022 | ........... H04L 41/145 |

*Primary Examiner* — Melvin H Pollack
(74) *Attorney, Agent, or Firm* — BEHMKE INNOVATION GROUP LLC; James M. Behmke; James J. Wong

(57) ABSTRACT

In one embodiment, a device obtains application data captured by an intermediate node in a network by inserting monitoring code into traffic associated with one or more online applications accessible via the network. The device identifies, based on the application data, a workflow of actions performed by a user of the one or more online applications. The device determines that a particular stage of the workflow is associated with a quality of experience metric for the one or more online applications being degraded. The device provides a recommended change in the network for presentation by a user interface that is expected to optimize the quality of experience metric for the one or more online applications.

20 Claims, 12 Drawing Sheets

(56) References Cited

U.S. PATENT DOCUMENTS

| | | | |
|---|---|---|---|
| 11,894,994 B2* | 2/2024 | Newell | H04L 43/062 |
| 11,895,035 B2* | 2/2024 | Chauhan | H04L 41/0823 |
| 11,902,115 B2* | 2/2024 | Eriksson | H04L 43/0894 |
| 11,922,220 B2* | 3/2024 | Haghighat | G06F 21/53 |
| 11,923,995 B2* | 3/2024 | Raleigh | H04W 4/50 |
| 2014/0303934 A1* | 10/2014 | Mylarappa | G06F 11/00 702/186 |
| 2015/0100679 A1* | 4/2015 | Chandaka | H04L 67/02 709/224 |
| 2017/0353516 A1* | 12/2017 | Gordon | H04L 65/80 |
| 2021/0243214 A1 | 8/2021 | Plonka et al. | |
| 2022/0014422 A1* | 1/2022 | Gupta Hyde | H04W 24/02 |
| 2022/0027431 A1* | 1/2022 | Zheng | H04L 41/142 |
| 2022/0107876 A1* | 4/2022 | Hamdi | G06F 11/0754 |
| 2022/0131744 A1 | 4/2022 | Kumar et al. | |
| 2022/0158926 A1* | 5/2022 | Wennerström | H04L 43/50 |
| 2022/0231964 A1* | 7/2022 | Alam | H04L 47/74 |
| 2022/0239578 A1* | 7/2022 | Raleigh | H04L 43/026 |
| 2022/0247678 A1* | 8/2022 | Atwal | H04L 45/645 |
| 2022/0286428 A1* | 9/2022 | Howe | H04L 63/0227 |
| 2022/0311681 A1* | 9/2022 | Palladino | H04L 41/0661 |
| 2022/0398603 A1* | 12/2022 | Manivannan | G06F 16/284 |
| 2022/0408255 A1* | 12/2022 | Howe | H04W 12/062 |
| 2023/0006889 A1* | 1/2023 | Thyagaturu | H04L 41/5054 |
| 2023/0246903 A1* | 8/2023 | Huet | H04L 41/5009 709/224 |
| 2023/0254547 A1* | 8/2023 | Tirella | H04B 7/18513 725/75 |
| 2023/0284077 A1* | 9/2023 | Pateromichelakis | H04L 47/28 370/235 |
| 2023/0325246 A1* | 10/2023 | Guim Bernat | G06F 9/5044 718/104 |
| 2023/0336468 A1* | 10/2023 | Christa | H04L 45/42 |
| 2023/0421513 A1* | 12/2023 | Jin | H04L 49/90 |
| 2024/0078172 A1* | 3/2024 | Duggal | G06F 11/3696 |
| 2024/0098612 A1* | 3/2024 | Xiong | H04W 36/30 |

* cited by examiner

DISCOVERING MULTI-APPLICATION WORKFLOWS TO IDENTIFY POTENTIAL QOE- IMPACTING ISSUES

TECHNICAL FIELD

The present disclosure relates generally to computer networks, and, more particularly, to discovering multi-application workflows to identify potential quality of experience (QoE)-impacting issues.

BACKGROUND

Application Performance Monitoring (APM) solutions such as Cisco AppDynamics, Datadog, and the like represents one way of gaining deep application-level insights, which can then be used to quantify the quality of user experience and identify where problems may occur. However, such tools work by using either client or server-side instrumentation, which require full access to the application code to be enabled and, consequently, are only available for application owners or vendors.

However, such solutions do not exist for application consumers which do not have control over the application infrastructure and cannot instrument it in order to get detailed application-level insights through directly client instrumentation. As a result, application visibility and application user experience for non-vendors is extremely limited today: i.e., it is not possible for a typical enterprise customer to reliably determine the quality of experience (QoE) of their online applications (e.g., Microsoft SharePoint, Concur, SAP, Workday, etc.) within its workforce. Even when some visibility exists, such as the case of QoE scores published by an application vendor, it may not be fully understood what drives the user experience scores and whether any change to the network or to the configurations of the client devices could be implemented to improve the experience of the users.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
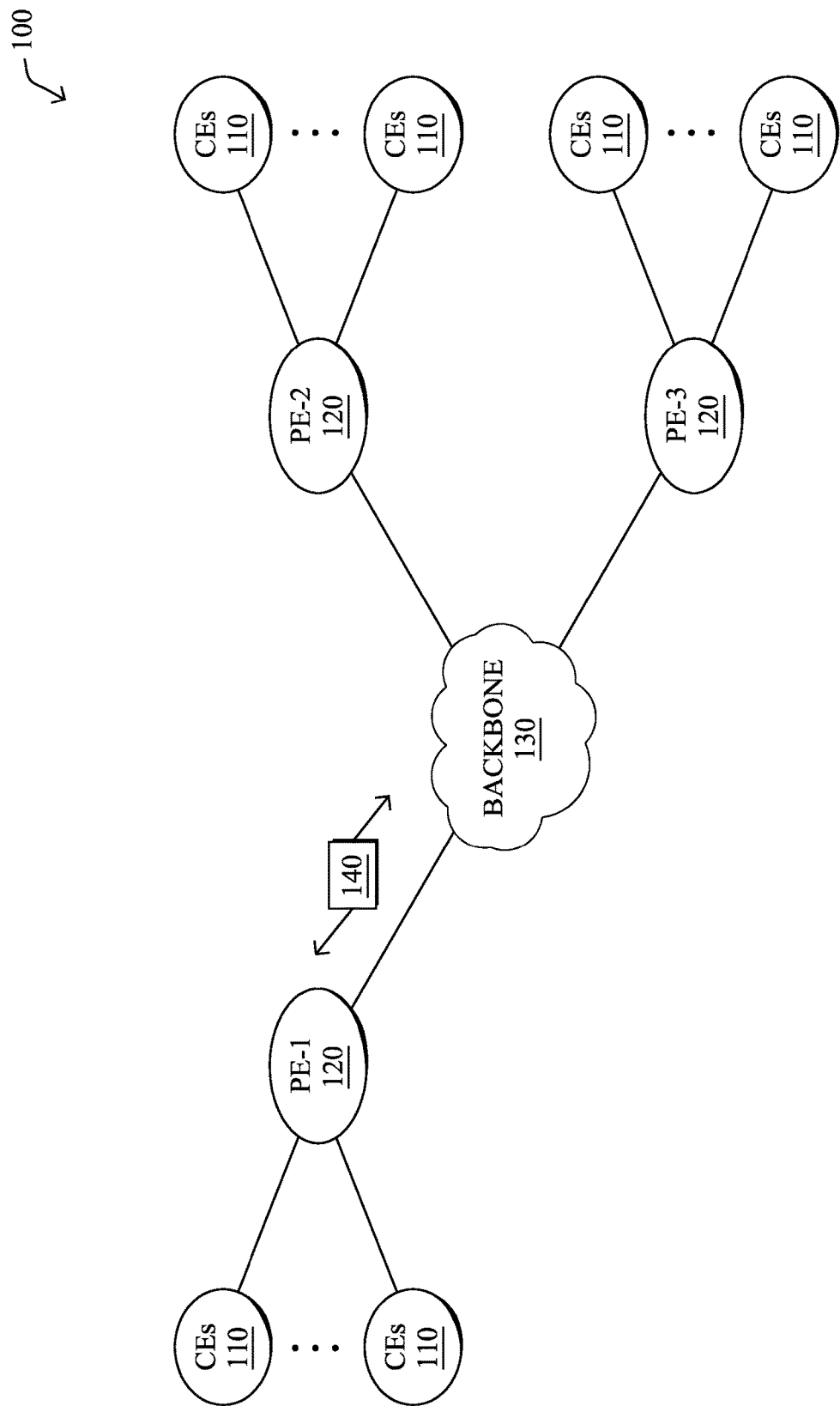
FIGS. 1A-1B illustrate an example communication network.

According to one or more embodiments of the disclosure, a device obtains application data captured by an intermediate node in a network by inserting monitoring code into traffic associated with one or more online applications accessible via the network. The device identifies, based on the application data, a workflow of actions performed by a user of the one or more online applications. The device determines that a particular stage of the workflow is associated with a quality of experience metric for the one or more online applications being degraded. The device provides a recommended change in the network for presentation by a user interface that is expected to optimize the quality of experience metric for the one or more online applications.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
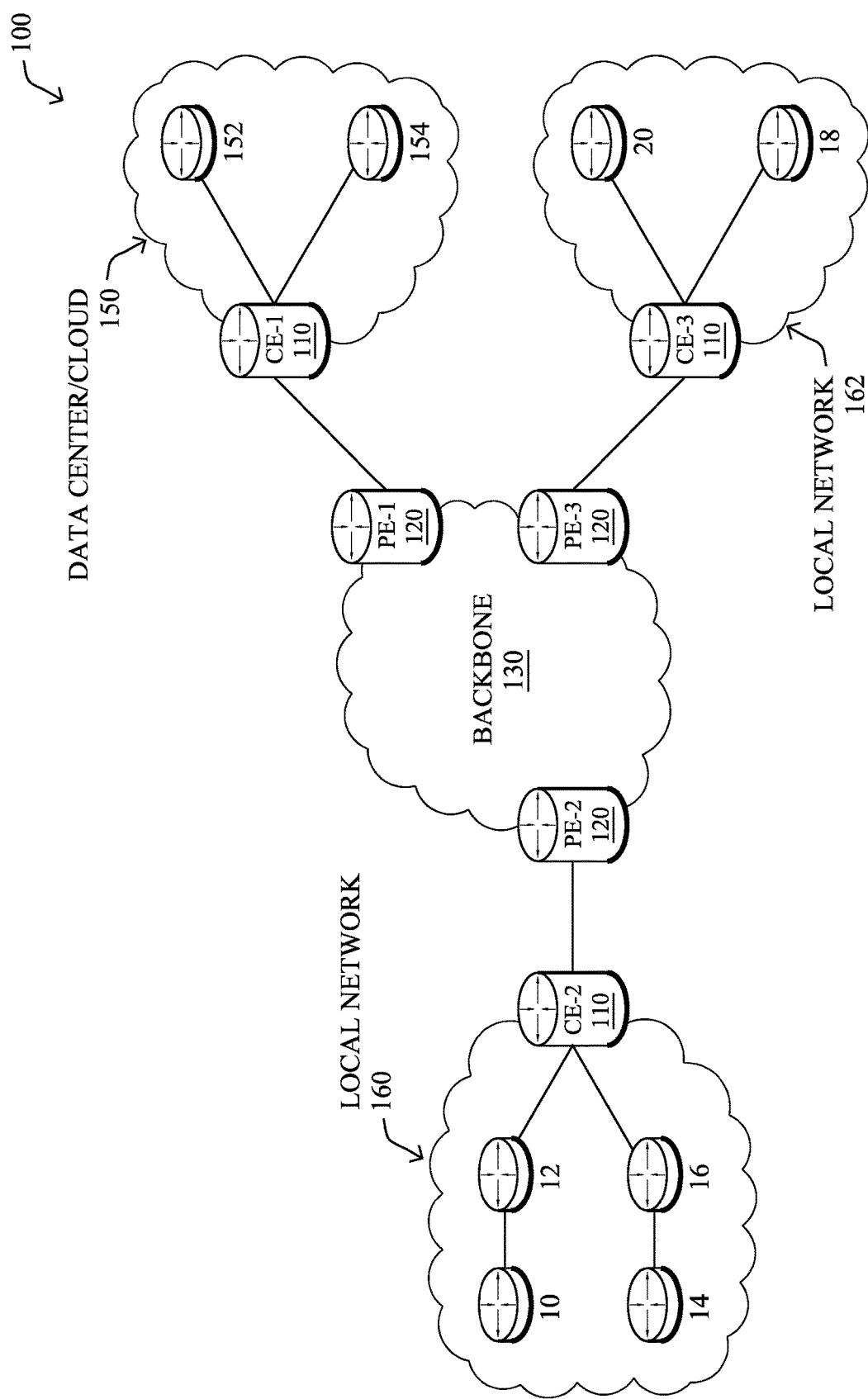

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
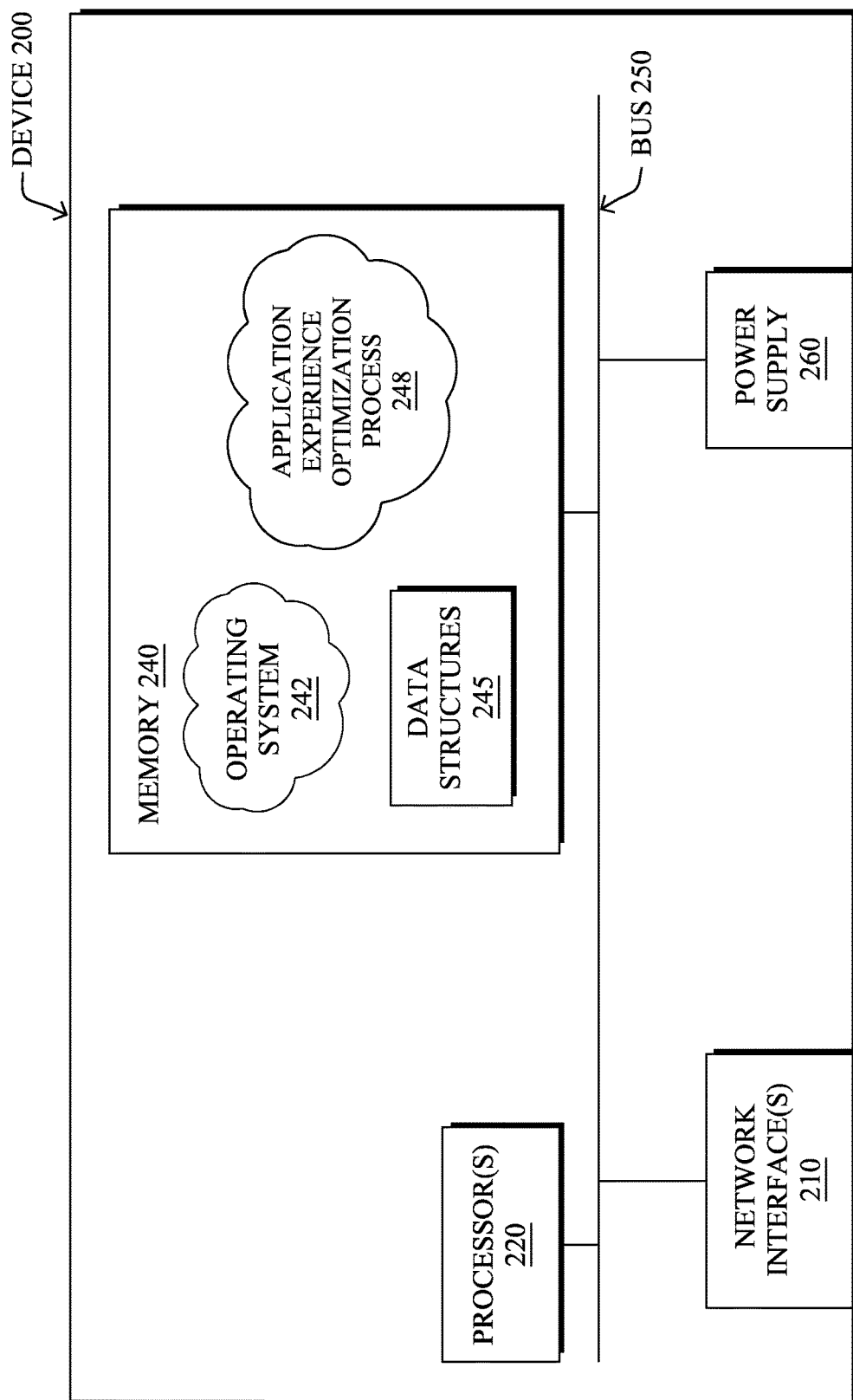
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
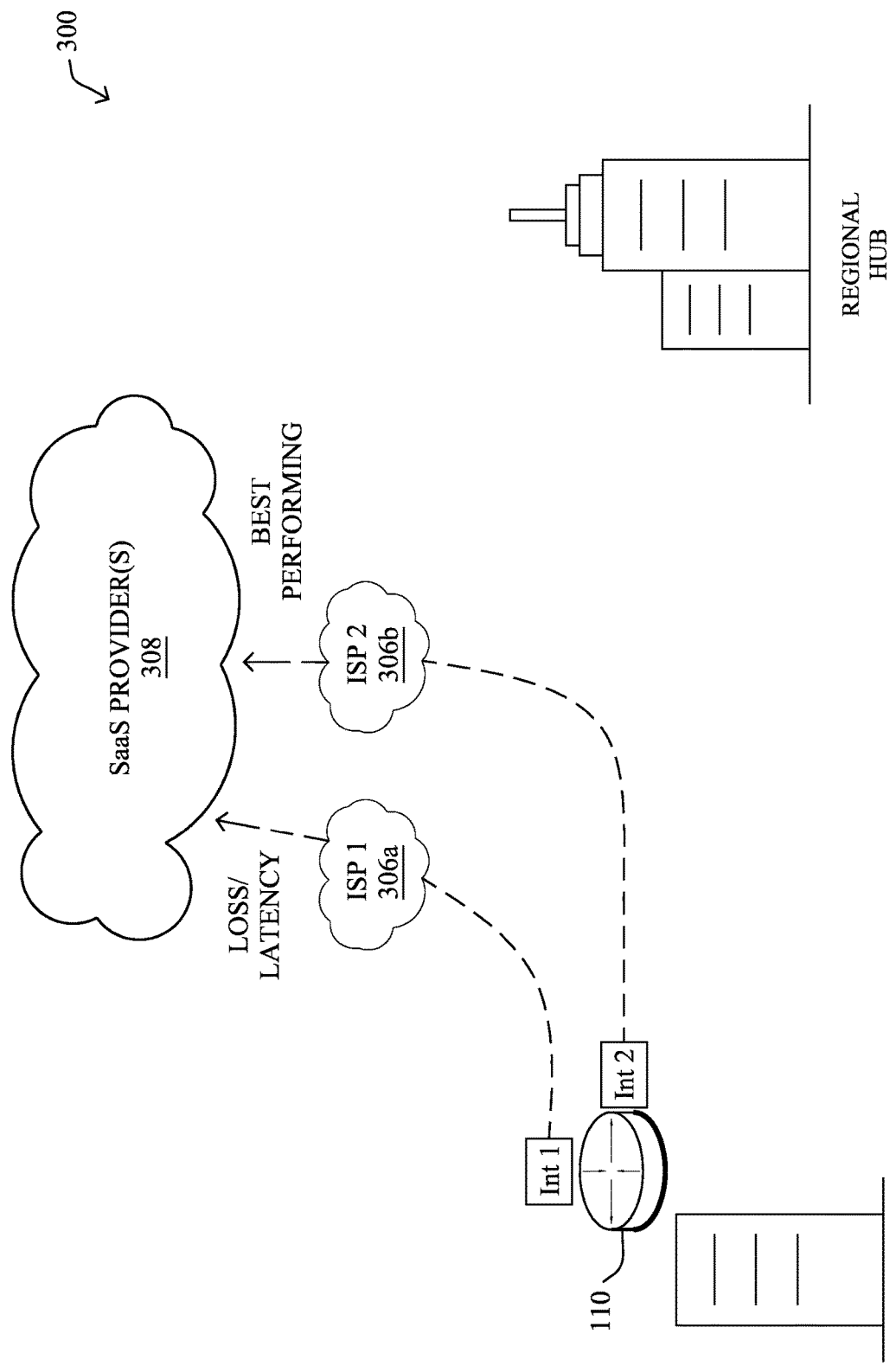
FIGS. 3A-3B illustrate example network deployments.
Figure 3B:
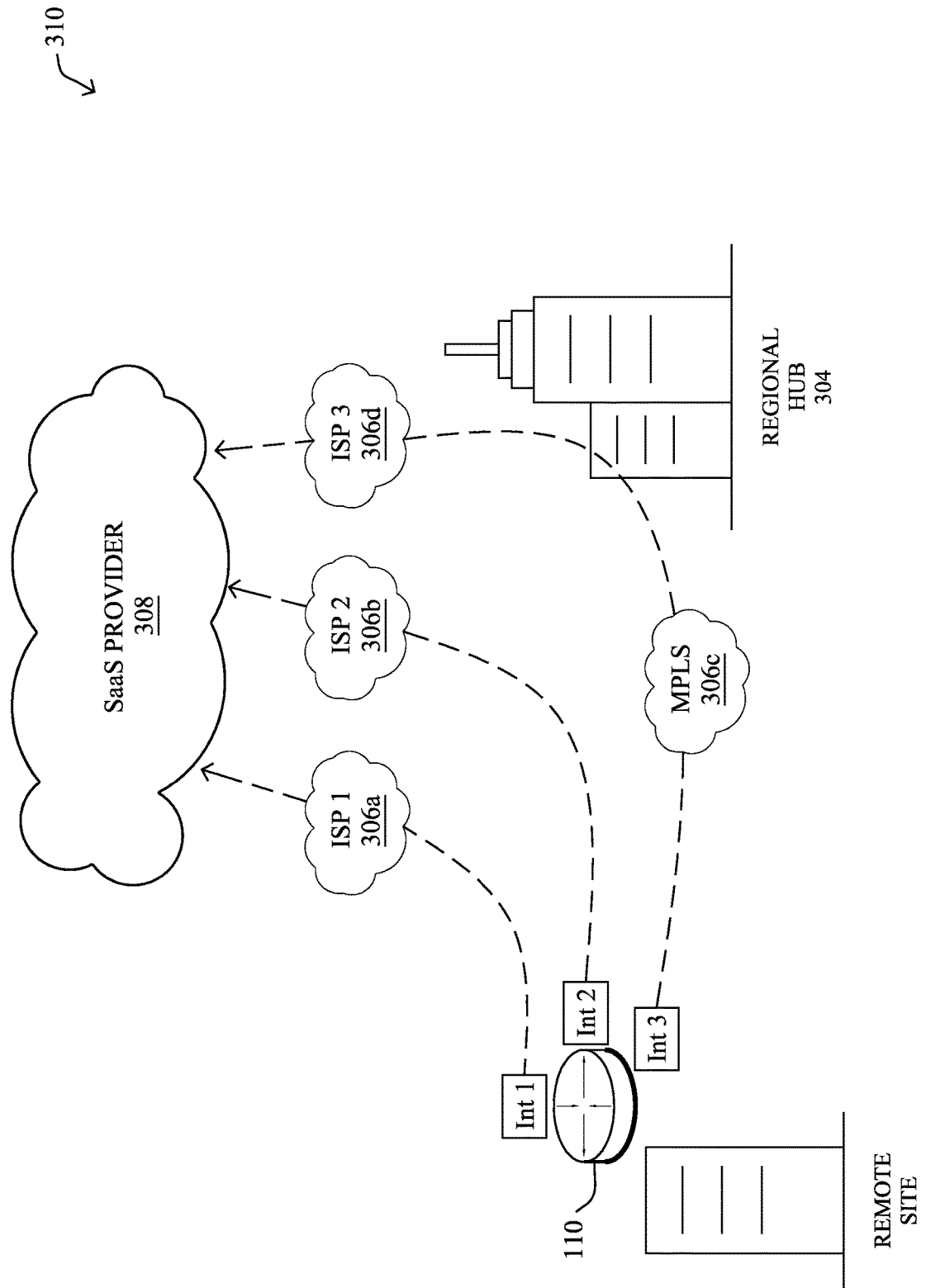

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
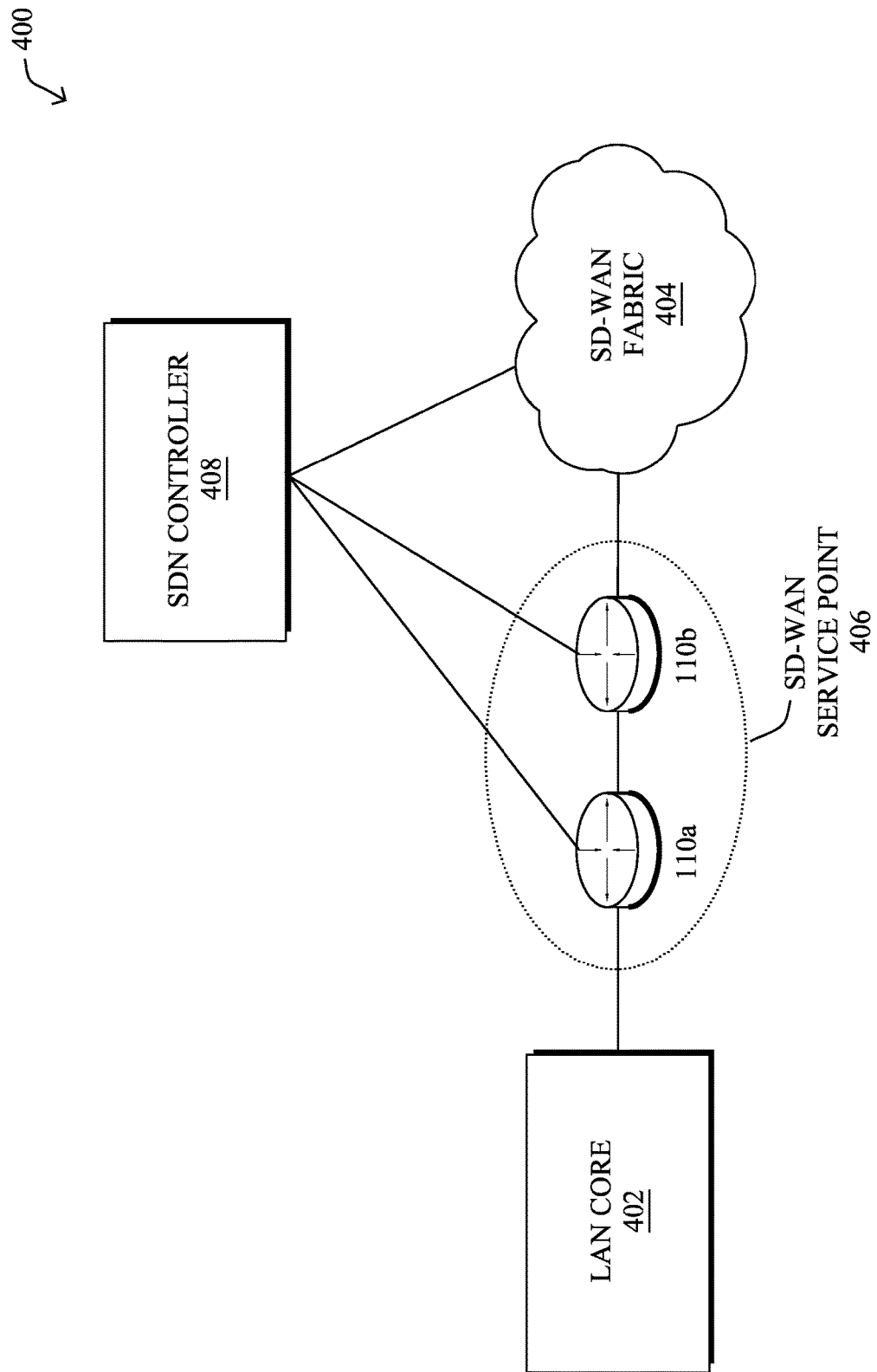
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:

New in-house applications being deployed;
New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
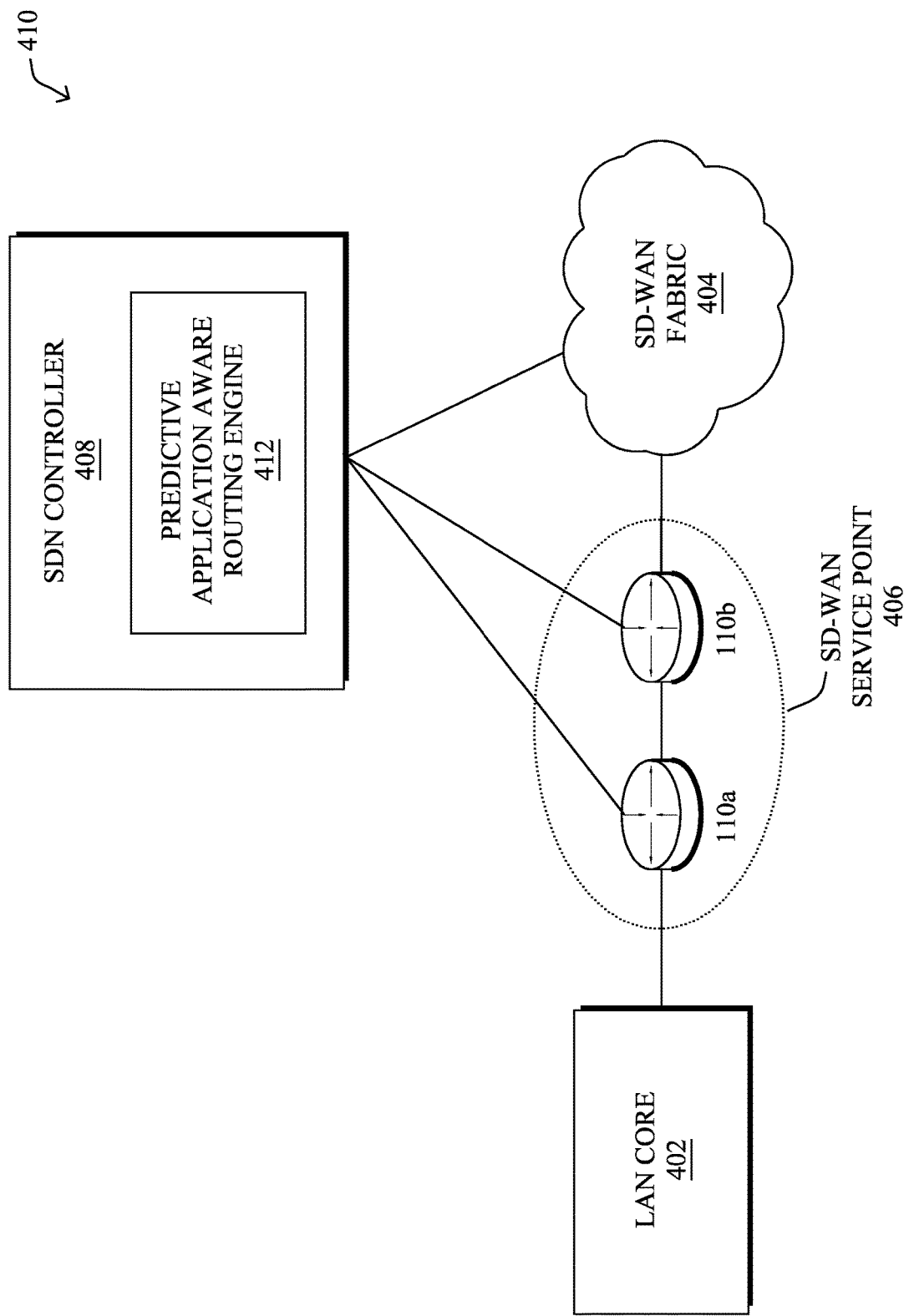

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, in recent years, enterprise networks have undergone a fundamental transformation whereby users and applications have become increasingly distributed thanks to networking technologies such as SD-WAN, Hybrid Work, and Zero Trust Network Access (ZTNA), which offer unprecedented flexibility. At the same time, digital transformation trends mean that businesses now rely on an increasing number of online applications for day-to-day business operations, which are predominantly consumed in a Software as a Service (SaaS) model and delivered from a shared public cloud infrastructure.

In the classic networking model, users located in corporate offices access a small number of applications deployed in on-premises datacenters with the application traffic never leaving the corporate network. When issues occurred in such networks, though, the IT administrator had complete visibility and control over the complete end-to-end traffic flow between the user and the application and could easily troubleshoot a small number of devices.

In contrast, modern network architectures enable users to work from anywhere (e.g., home, office, train, coffee shop, etc.) and use online applications delivered from a variety of private and public cloud platforms. While the advantages this flexibility brings cannot be contested, it also leads to an in increase in complexity and decrease of control and visibility for IT and network administrators. When issues do occur, multiple technology domains need to be troubleshooted, requiring the cooperation of several business entities (e.g., IT admin, the service provider, Cloud or application provider, etc.). In this highly dynamic environment, the ability of IT administrators to understand user experience for critical applications, identify potential issues and implement remediation actions becomes increasingly challenging.

Application Performance Monitoring (APM) solutions such as Cisco AppDynamics, Datadog, and the like, represent one way of gaining deep application-level insights, which can then be used to quantify the quality of user experience and identify where problems may occur. However, such tools work by using either client or server-side instrumentation, which require full access to the application code to operate and, as such, are only available for application owners or vendors.

However, such APM solutions do not exist for application consumers, who do not have control over the application infrastructure and cannot instrument it in order to get detailed application-level insights through directly client instrumentation. As a result, application visibility and application user experience for non-vendors is extremely limited today. For instance, it is not currently possible for a typical enterprise customer to reliably determine the quality of experience for online applications such as Microsoft SharePoint, Concur, SAP, Workday, etc. for its enterprise users. Even when some visibility exists, such as in the case of QoE scores published by an application vendor via a user interface (UI) or application programming interface (API), it may not be fully understood what drives the user experience scores and whether any change to the network or end-user devices' configuration can be implemented to improve experience.

Discovering Multi-Application Workflows to Identify Potential QoE-Impacting Issues The techniques herein allow for the discovery of multi-application workflows to identify potential QoE-impacting issues by redirecting web application client traffic, in order to instrument it to provide Real User Monitoring (RUM) telemetry used to discover application workflows and stages within. In turn, the techniques herein seek to optimize the workflows, if possible, such as by redirecting poorly performing client sessions over another network path (or service chain). In various embodiments, the techniques herein address the above limitations of current APM solutions by:

Orchestrating the collection of detailed application telemetry in enterprise networks using an approach such as 1.) injecting JavaScript monitoring code in application pages and/or 2.) deploying endpoint monitoring agents on user devices resulting in similar levels of visibility as those available for application owners (vendors) via APM solutions.

Analyzing typical application workflows (e.g., common sequences of pages or actions), and assigning users to those, providing deep application-level visibility per workflow and user. The techniques herein can also analyze multi-application workflows to discover patterns such as going to a procurement application first, then to a secondary application for approvals, then to yet another application for shipping and tracking.

Enriching application workflow statistics with additional context such as underlying network conditions in the form of quality metrics of the path(s) used, policy information (routing, firewall, QoS), network alarms and events or information about the end user device, various software versions, CPU and memory utilization, etc.

Assessing whether there are any network related actions that can be employed and are likely to improve the user experience for specific workflows. For example, some application workflows may benefit from shorter latency paths, in which case enforcing optimal path selection on a border router or a firewall may lead to significant QoE improvements. That assessment also includes simulation and allows to make balanced decisions (e.g., by delivering slightly worse experience at stages 1-2 of the specific workflow, but the total experience will still improve because of significant improvement in stage 3).

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device obtains application data captured by an intermediate node in a network by inserting monitoring code into traffic associated with one or more online applications accessible via the network. The device identifies, based on the application data, a workflow of actions performed by a user of the one or more online applications. The device determines that a particular stage of the workflow is associated with a quality of experience metric for the one or more online applications being degraded. The device provides a recommended change in the network for presentation by a user interface that is expected to optimize the quality of experience metric for the one or more online applications.

Figure 5A:
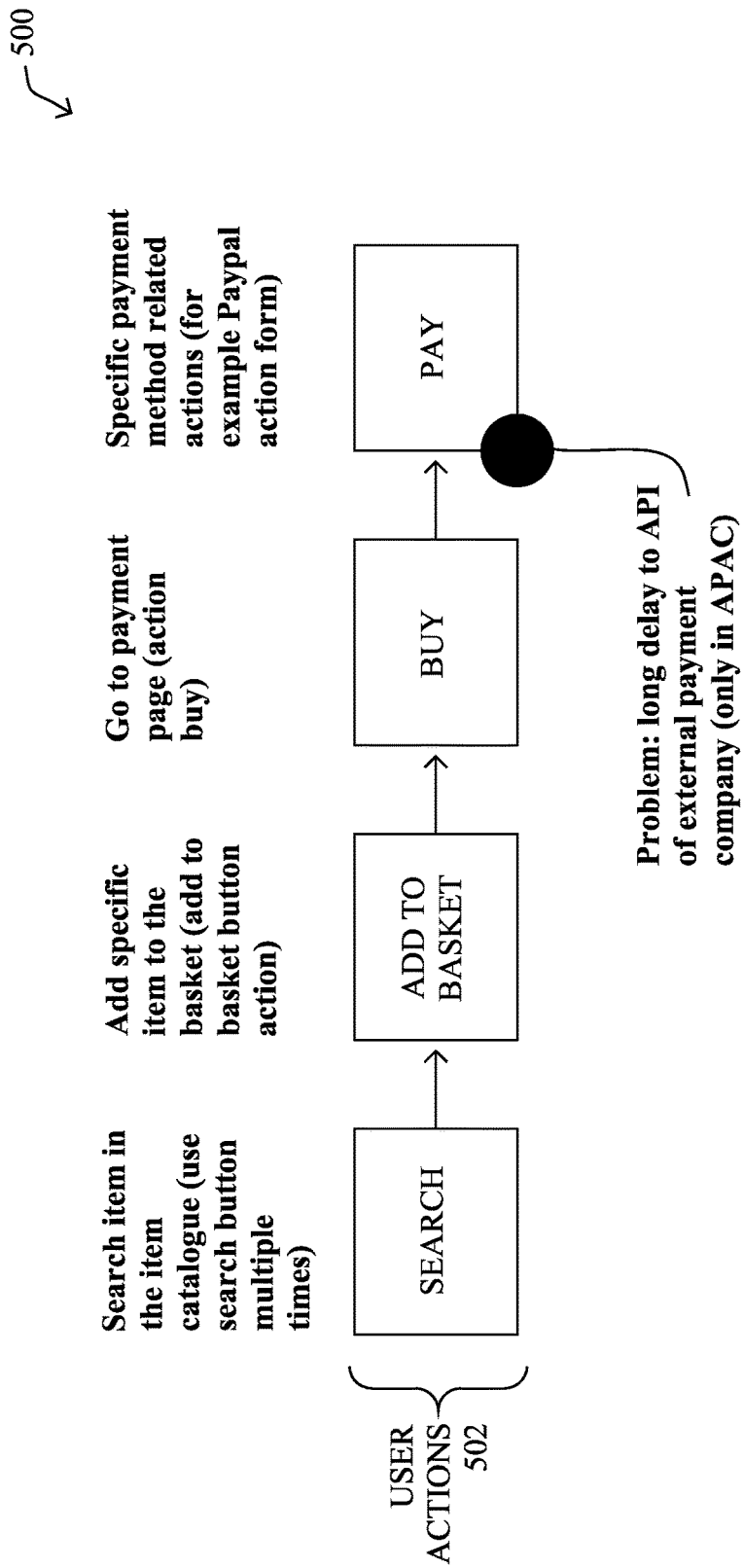
FIGS. 5A-5B illustrate examples of multi-application workflows of actions.
Figure 5B:
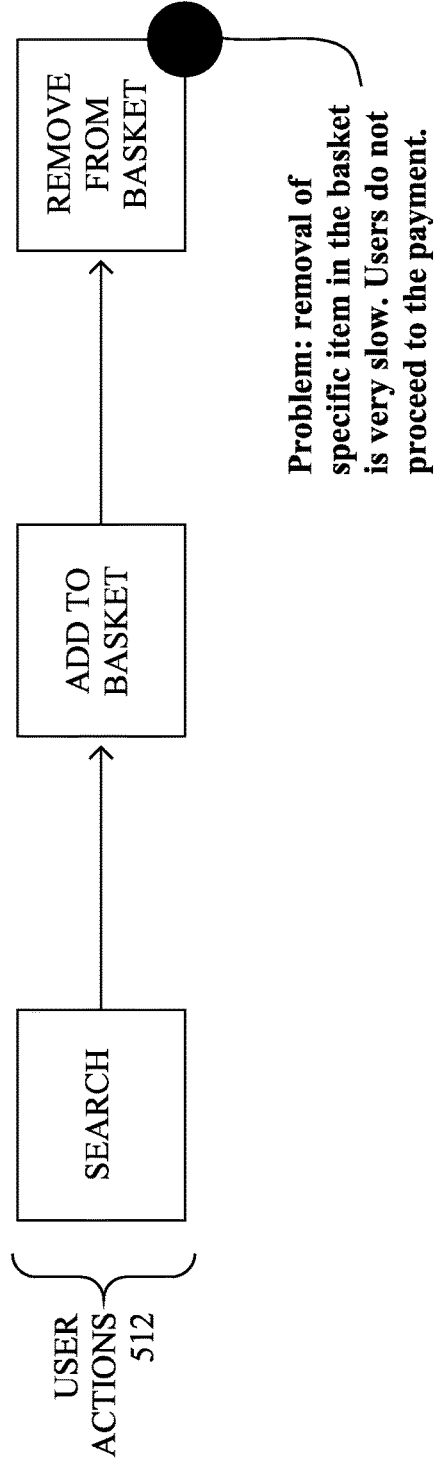

Operationally, FIGS. 5A-5B illustrate examples of multi-application workflows of actions, according to various embodiments. As shown in workflow 500 in FIG. 5A, assume that a user interacts with a hypothetical procurement application provided by a third-party SaaS vendor by performing user actions 502 within the application. Note that the such actions may also be across multiple applications, as well, such as by interacting with a separate payment application, as well. More specifically, assume that the user performs user actions 502 in workflow 500 sequentially: 1.) by first performing a search for specific item (e.g., by using a search button in the procurement application multiple times), 2.) adding a specific item into their basked (e.g., by clicking an 'add to basket' button in the application, 3.) opting to buy the item (e.g., by navigating to a payment page by clicking a 'buy' button), and 4.) paying for the item (e.g., by providing payment information, which may be with a separate application, such as Paypal, than that of the procurement application itself).

Now, assume that one of the particular stages of workflow 500 exhibits degraded QoE, resulting in degraded QoE for the entirety of workflow 500. For instance, in FIG. 5A, assume that the API call to the payment processing application takes an excessive amount of time, but only in a certain geographic region, such as Asia Pacific (APAC). Using the techniques herein, the system can not only identify such a QoE-impacting issue, but also provide a recommended change to the network, such as by redirecting the corresponding application traffic via a different region.

Continuing the above example of a procurement application, FIG. 5B illustrates another potential workflow 510 comprising a series of user actions 512. Here, assume that after a user adds the specific time to their basket, they then change their mind and opt to remove it from their basket, as opposed to completing its purchase as in workflow 500. Further, assume that the QoE for workflow 510 is attributable to the final stage of workflow 510 whereby the removal action from the basket is very slow. Unlike the QoE degradation associated with workflow 500, though, the QoE degradation in this case is attributable to a bug in the software. In both cases, the techniques herein allow for the detection of both the workflows themselves, as well as their root causes of QoE degradation. Indeed, learning such workflows in relation with the network provides a much required level of visibility (potentially part of the Full Stack Observability FSO) and the ability to trigger network remediation to improve the user experience.

Figure 6:
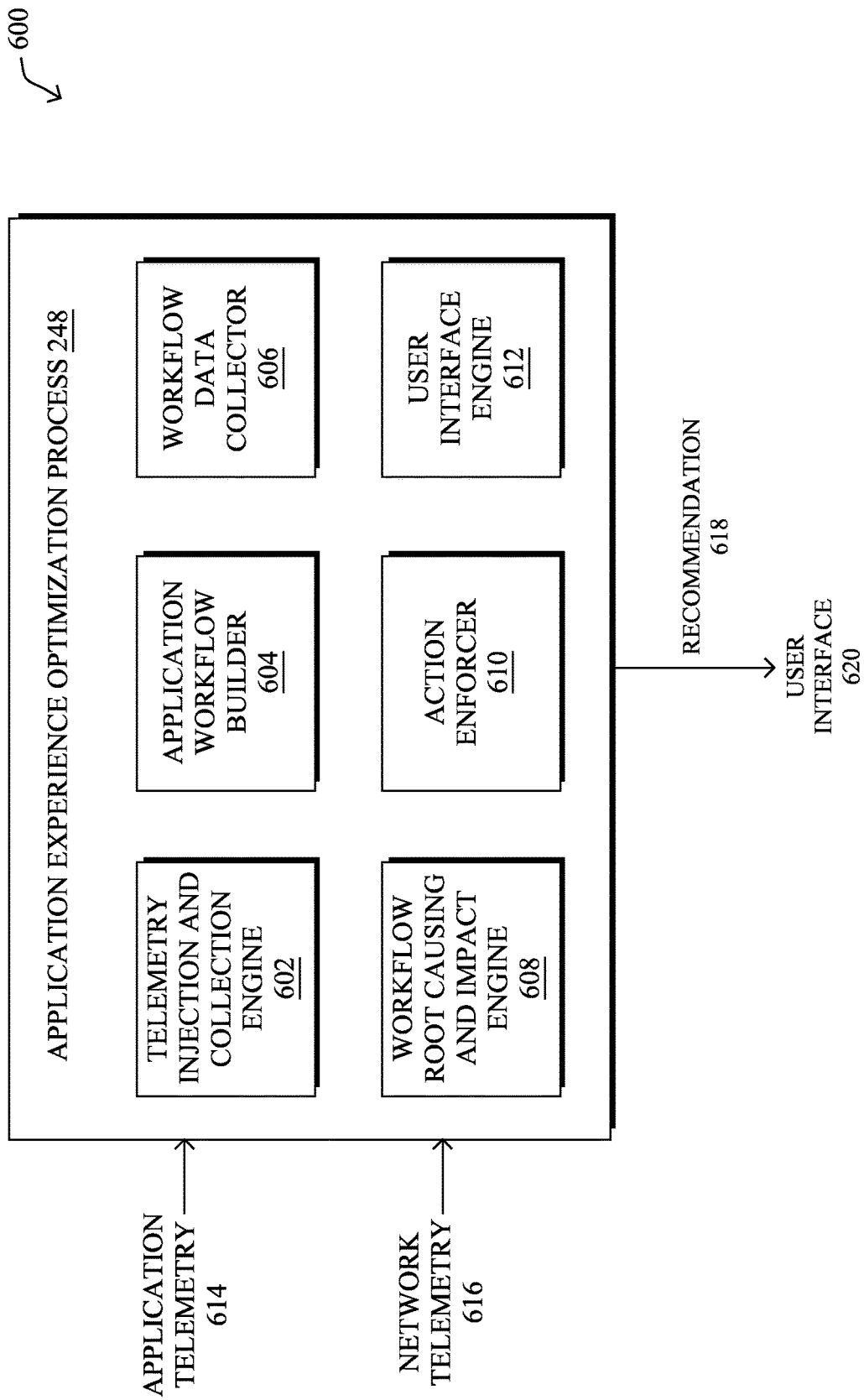
FIG. 6 illustrates an example architecture for discovering multi-application workflows to identify potential quality of experience (QoE)-impacting issues.

FIG. 6 illustrates an example architecture 600 for discovering multi-application workflows to identify potential quality of experience (QoE)-impacting issues, according to various embodiments. At the core of architecture 600 is application experience optimization process 248, which may be executed by a controller for a network, a networking device, a service, or another device in communication with a network to be monitored. For instance, application experience optimization process 248 may be executed by a controller for a network (e.g., SDN controller 408 in FIGS. 4A-4B), a particular networking device in the network (e.g., a router, a firewall, etc.), another device or service in communication therewith, or the like, to perform the techniques herein.

As shown, application experience optimization process 248 may include any or all of the following components: telemetry injection and collection engine 602, application workflow builder 604, workflow data collector 606, workflow root causing and impact engine 608, action enforcer 610, and/or user interface engine 612. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various embodiments, telemetry injection and collection engine 602 may be responsible for obtaining application telemetry 614 regarding the application traffic sent between endpoint clients and online applications. In one embodiment, application telemetry 614 may be captured by code inserted into that of the application under scrutiny, such as JavaScript-based instrumentation code. The purpose of this injection is to mimic how application vendors would apply Real User Monitoring (RUM) to their own applications. In turn, application experience optimization process 248 may use application telemetry 614 to discover the (multi-)application workflows, as detailed below. Preferably, this telemetry collection will also be transparent to the end users.

Figure 7:
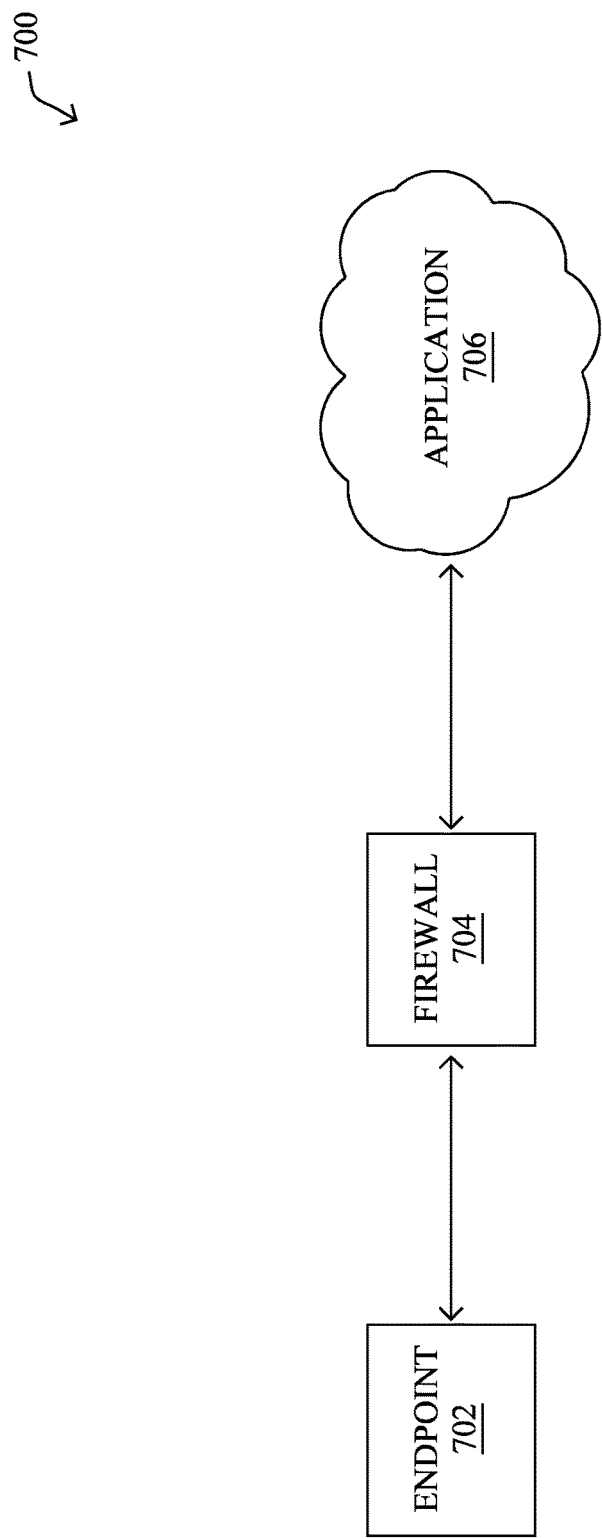
FIG. 7 illustrates an example of an intermediate node in a network injecting monitoring code into application traffic.

In some embodiments, an intermediate network node such as a firewall, router, or the like may intercept and decrypt the application traffic, inject specific instrumentation code into it, and then re-encrypt it, before sending it onward towards its destination. For instance, FIG. 7 illustrates an example 700 of an intermediate node in a network injecting monitoring code into application traffic. For instance, assume that an endpoint 702 and an application 706 exchange application traffic with one another via an intermediate network node, such as firewall 704. In such a case, firewall 704 may intercept such traffic, decrypt it, inject JavaScript code into it, to monitor the user actions being performed, re-encrypt the traffic, and send it on to its destination. In other cases, the decryption and code injection could occur also within an SD-WAN network on a router running the right set of security services.

This monitoring approach should be relatively easy to implement in many networks, as similar scenarios already exist in many corporate networks (i.e., TLS decryption and encryption for security purposes). Here, though, the intermediate node would now be doing so for purposes of application workflow discovery and optimizing the QoE of that application.

In various embodiments, the intermediate node should inject the JavaScript (or other) monitoring code in the right requests. For instance:
- For single page applications, the code should be injected on the main HTML document for the application, and should be flexible enough to support most common forms of single-page application routing, such as hash-based routing, memory-based routing, etc.
- For multi-page applications, the code might need to be injected on all requests where the response's content-type corresponds to HTML.
- In all cases, this can be configured by the enterprise after manual inspection of the target application's setup.

One of the challenges when injecting custom JavaScript code into SaaS applications is to make sure doing so does not negatively impact the application itself. In some embodiments, to achieve that, a dedicated sandbox service can be used first along with synthetic application tests (e.g., ThousandEyes transaction test or using other probing agents), making sure that the tests run successfully (i.e., that they perform the desired application activity without any additional errors). Only once those changes are tested with synthetic application activity might they be deemed eligible for use with real user traffic. In addition, the whole process could be fully automated via the integration of the proposed system. Of course, negative feedback from these synthetic tests can also the system to attempt to inject JavaScript code in a different JavaScript web component, in order to retest and find the working scenario.

Multiple applications can be instrumented to generate application telemetry 614, and the telemetry can be stitched together to allow for multi-application analysis in the next components.

In another embodiment, telemetry injection and collection engine 602 may achieve the same goals by collecting telemetry via an agent running locally on the user endpoint (e.g., a Thousand Eyes Endpoint agent, custom browser extensions, etc.). The ultimate result is rich RUM-like telemetry accessible via APIs for any application vendor used, with minimal to no impact on users.

In various embodiments, application workflow builder 604 may take the application telemetry 614 collected by telemetry injection and collection engine 602 as input. As noted, application telemetry 614 may include client-side information about all the activity executed by the client (all "clicks and actions on a specific web page"). In turn, application workflow builder 604 may try to discover the corresponding application workflows. To this end, application workflow builder 604 could leverage an off-the-shelf solution for clickstream analysis or RUM, for instance.

Application workflow builder 604 may output graphs (edges and nodes) for a number of typical workflows. To achieve that, application workflow builder 604 may leverage different statistical approaches and may produce workflows either for a single application, or for multiple application, as desired.

In various embodiments, workflow data collector 606 may use the workflows discovered by application workflow builder 604 and overlay those over real application user traffic (e.g., from RUM telemetry), in order to collect performance telemetry for each user and workflow. In some instances, workflow data collector 606 may do so only for the most interesting workflows/users/locations, according to some administrator-defined constraints.

For instance, given workflow 500 in FIG. 5A, workflow data collector 606 may detect workflow 500 and generate a representation of workflow 500. In such a case, workflow data collector 606 may output data indicative of the following: "this workflow is causing a significant fraction of users to notice 30 second delay at the payment and failure at this stage of the workflow."

At this stage, workflow data collector 606 may also compute the average user experience (QOE) per site/location/user, per application, and/or per workflow. To do so, workflow data collector 606 may leverage application telemetry 614 or even network telemetry collected from the network. Here, though, the aim is not to have a perfect definition of QoE, but rather a relative proxy metric which will allow for the comparison between different scenarios to improve, if possible. In this case, the QoE metric could be the total time used on average for the whole workflow and each stage. For instance, in workflow 500 in FIG. 5A, at the last stage (payment), that value would be extremely high (anomalous) and that will be the starting point for the following component.

In a second stage, workflow data collector 606 may interact with network analytics engines, such as vAnalytics or Meraki dashboard, to enrich application workflow statistics with additional context such as underlying network conditions (e.g., as reported by network telemetry 616) in the form of quality metrics of the path(s) used, policy information (routing, firewall, QoS), network alarms and events or information about the end user device, various software versions, CPU, memory utilization, or the like.

In various embodiments, workflow root causing and impact engine 608 may perform additional root causing to understand the type of failure and generate a recommendation (e.g., recommendation 618) to fix the issue or work around it. In general, issues can be caused by either the network or by the application. To assess whether a QoE degradation issue is a networking problem, workflow root causing and impact engine 608 may look across all the locations and assess whether there are cases when there are no such problems.

Based on the example in FIG. 5A, for instance, workflow root causing and impact engine 608 may detect that workflow 500 is impacting users only in the APAC region, while not affecting those in the Europe, the Middle East, and Africa (EMEA) or United States (US) regions. As a result, it could propose that action enforcer 610 redirect that specific traffic over a site in EME, to test whether that has improved user experience or trigger other networking action such as prioritizing the flow destinated to specific destinations. In other words, workflow root causing and impact engine 608 may operate in conjunction with action enforcer 610, in some instances, to experiment and confirm the root cause.

Another example might be more specific. Workflow root causing and impact engine 608 may detect the payment issue is specific to the traffic egressing over very specific site and router with low link ISP and lack of QoS policies. As a result, it could propose that action enforcer 610 configure a QoS policy on that router to add that specific traffic to the priority queue.

Yet another example might involve a case where workflow root causing and impact engine 608 detects a very specific SD-WAN security policy (in a set of sites) performing TLS decryption which is failing the certificate validation with the payment site associated with the final stage of workflow 500 (because of certificate pinning). That could be validated by adjusting that security policy configuration and excluding payment site from TLS decryption (again executed by action enforcer 610).

Yet another example is workflow root causing and impact engine 608 detecting a global SaaS application vendor outage by using ThousandEyes Application Outages functionality or similar network functionality. With such an integration, workflow root causing and impact engine 608 may get immediate confirmation that specific payment gateway is currently having issues in a specific region only (or whole SaaS application is impacted in a specific region), thus determining the root cause of the degraded QoE of workflow 500.

For application related issues, workflow root causing and impact engine 608 may be able to detect that specific workflow issue is related to specific web browser type and version. In such a case, recommendation 618 may suggest that the user switch to using a recommended web browser (e.g., a particular type or version).

Workflow root causing and impact engine 608 may also gather feedback from the users, which would be strong confirmation that the detected issues are real. In turn, workflow root causing and impact engine 608 could then monitor the fraction of impacted users that change their web browser to the recommended one and present all the results of that automated root causing process.

Workflow root causing and impact engine 608 may also include simulation/assessment functionality, as well, to help determine the optimal recommendation. For example, workflow root causing and impact engine 608 could recommend changing the network path in a way that it will deteriorate the experience at stage1 and stage2 of the workflow, but greatly improve it at stage 3 of the same workflow. In such a case, the overall improvement to the QoE metric might be significant, but it might also depend on the situation/customer/additional constrains. In some instances, workflow root causing and impact engine 608 may also seek approval from an administrator before implementing such a recommendation and/or leverage action enforcer 610 to perform synthetic testing, beforehand.

In various embodiments, action enforcer 610 may take the recommendations from workflow root causing and impact engine 608 and implement them, to test and confirm that the identified root cause of the degradation was correct and the recommendation actually improves the user experience. In turn, action enforcer 610 may report the results of this testing back to workflow root causing and impact engine 608 for further root causing and validation. In some instances, action enforcer 610 may consist of multiple connectors (e.g., public cloud providers, SD-WANs, etc.), allowing it to perform a wide range of activities across diverse types of solutions. Note also that there may be multiple types of changes that could be recommended and tested, such as the following:

Physical/logical network change (e.g., send traffic over different ISP/tunnel/VLAN, etc.)

Service chaining (e.g., send traffic over Web proxy or SIG or directly)

Policy changes (e.g., changing a network security policy between less vs. more aggressive)

Finally, user interface engine 612 may be configured to present the workflows, recommendations, and/or testing results to a user interface 620 for presentation to a user. For instance, user interface engine 612 may provide recommendation 618 to user interface 620, suggesting a particular network change, as well as the underlying contextual data surrounding recommendation 618. Administrators of the system may also be able to contact specific users to validate some of the findings and accept some of the actions proposed by workflow root causing and impact engine 608 (possibly only in specific regions/locations, depending on the risks), as well.

Figure 8:
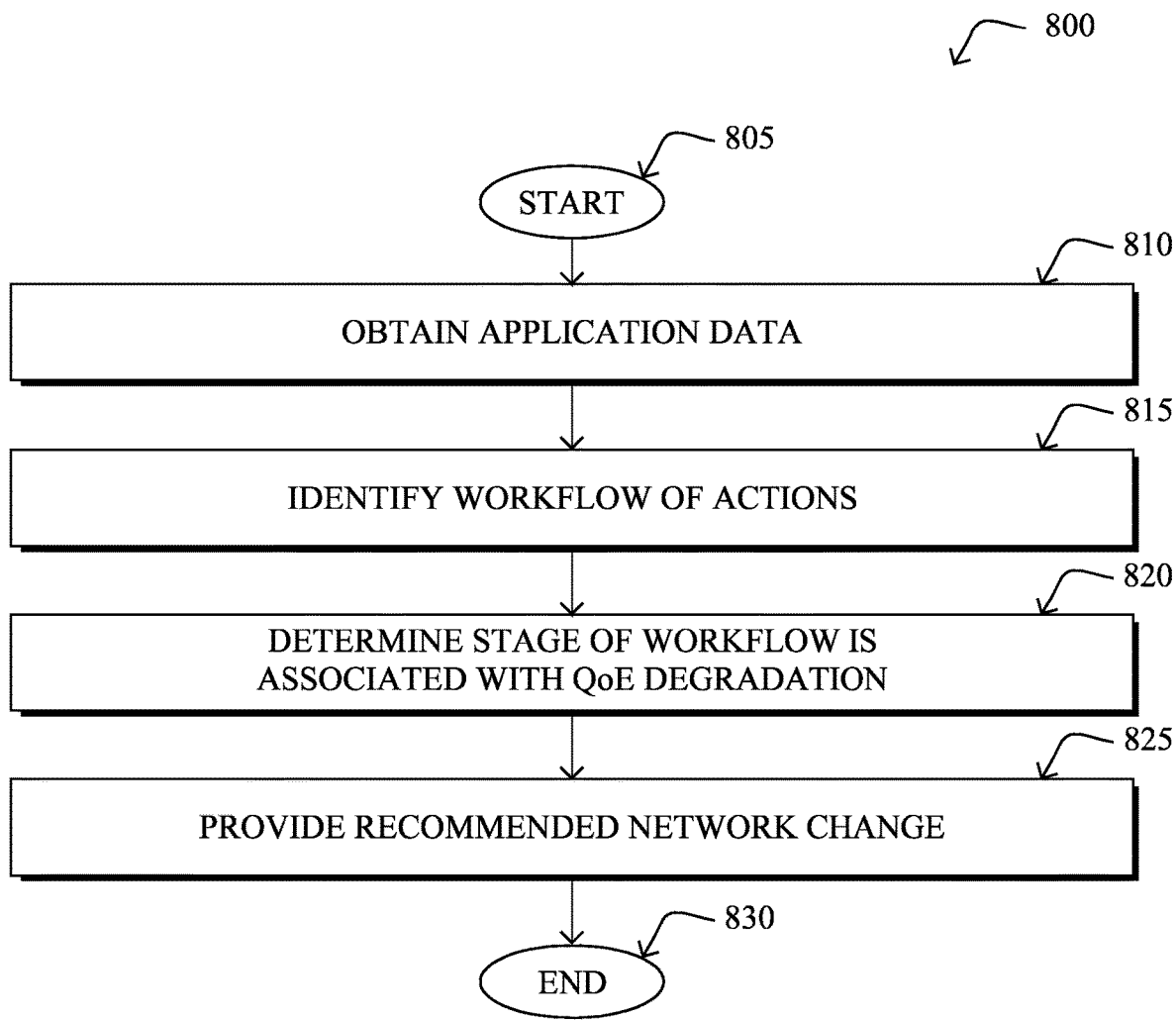
FIG. 8 illustrates an example simplified procedure for discovering multi-application workflows to identify potential quality of experience (QoE)-impacting issues.

FIG. 8 illustrates an example simplified procedure 800 (e.g., a method) procedure for discovering multi-application workflows to identify potential QoE-impacting issues, in accordance with one or more embodiments described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., application experience optimization process 248). The procedure 800 may start at step 805, and continues to step 810, where, as described in greater detail above, the device may obtain application data captured by an intermediate node in a network by inserting monitoring code into traffic associated with one or more online applications accessible via the network. In some embodiments, the intermediate node comprises a router or firewall. In further embodiments, the intermediate node inserts the monitoring code in part by intercepting and decrypting the traffic.

At step 815, as detailed above, the device may identify, based on the application data, a workflow of actions performed by a user of the one or more online applications.

At step 820, the device may determine that a particular stage of the workflow is associated with a quality of experience metric for the one or more online applications being degraded, as described in greater detail above. In one embodiment, the quality of experience metric indicates a completion time for the workflow.

At step 825, as detailed above, the device may provide a recommended change in the network for presentation by a user interface that is expected to optimize the quality of experience metric for the one or more online applications. In some embodiments, the recommended change comprises sending the traffic via a different transport option in the network. In other embodiments, the recommended change comprises implementing service chaining of the traffic. In some embodiments, the device may generate the recommended change in part by associating the workflow with network telemetry collected from the network. In additional embodiments, the recommended change is expected to degrade the quality of experience metric for another stage of the workflow but improve the quality of experience metric for the particular stage and for the workflow overall. In one embodiment, the device may simulate implementation of the recommended change, prior to providing the recommended change for presentation by the user interface. In yet another embodiment, the recommended change comprises a security policy change for the network.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for discovering multi-application workflows to identify potential QoE-impacting issues, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, application data captured by an intermediate node in a network by inserting monitoring code into traffic associated with one or more online applications accessible via the network;
   identifying, by the device and based on the application data, a workflow of actions performed by a user of the one or more online applications;
   determining, by the device, that a particular stage of the workflow is associated with a quality of experience metric for the one or more online applications being degraded; and
   providing, by the device, a recommended change in the network for presentation by a user interface that is expected to optimize the quality of experience metric for the one or more online applications.

2. The method as in claim 1, wherein the recommended change comprises sending the traffic via a different transport option in the network.

3. The method as in claim 1, wherein the recommended change comprises implementing service chaining of the traffic.

4. The method as in claim 1, further comprising:
   generating the recommended change in part by associating the workflow with network telemetry collected from the network.

5. The method as in claim 1, wherein the intermediate node inserts the monitoring code in part by intercepting and decrypting the traffic.

6. The method as in claim 1, wherein the recommended change is expected to degrade the quality of experience metric for another stage of the workflow but improve the quality of experience metric for the particular stage and for the workflow overall.

7. The method as in claim 1, further comprising:
   simulating, by the device, implementation of the recommended change, prior to providing the recommended change for presentation by the user interface.

8. The method as in claim 1, wherein the quality of experience metric indicates a completion time for the workflow.

9. The method as in claim 1, wherein the recommended change comprises a security policy change for the network.

10. The method as in claim 1, wherein the intermediate node comprises a router or firewall.

11. An apparatus, comprising:
    one or more network interfaces;
    a processor coupled to the one or more network interfaces and configured to execute one or more processes; and
    a memory configured to store a process that is executable by the processor, the process when executed configured to:
    obtain application data captured by an intermediate node in a network by inserting monitoring code into traffic associated with one or more online applications accessible via the network;
    identify, based on the application data, a workflow of actions performed by a user of the one or more online applications;
    determine that a particular stage of the workflow is associated with a quality of experience metric for the one or more online applications being degraded; and
    provide a recommended change in the network for presentation by a user interface that is expected to optimize the quality of experience metric for the one or more online applications.

12. The apparatus as in claim 11, wherein the recommended change comprises sending the traffic via a different transport option in the network.

13. The apparatus as in claim 11, wherein the recommended change comprises implementing service chaining of the traffic.

14. The apparatus as in claim 11, wherein the process when executed is further configured to:
    generate the recommended change in part by associating the workflow with network telemetry collected from the network.

15. The apparatus as in claim 11, wherein the intermediate node inserts the monitoring code in part by intercepting and decrypting the traffic.

16. The apparatus as in claim 11, wherein the recommended change is expected to degrade the quality of experience metric for another stage of the workflow but improve the quality of experience metric for the particular stage and for the workflow overall.

17. The apparatus as in claim 11, wherein the process when executed is further configured to:
   simulate implementation of the recommended change, prior to providing the recommended change for presentation by the user interface.

18. The apparatus as in claim 11, wherein the quality of experience metric indicates a completion time for the workflow.

19. The apparatus as in claim 11, wherein the recommended change comprises a security policy change for the network.

20. A tangible, non-transitory, computer-readable medium storing program instructions that cause a device to execute a process comprising:
   obtaining, by the device, application data captured by an intermediate node in a network by inserting monitoring code into traffic associated with one or more online applications accessible via the network;
   identifying, by the device and based on the application data, a workflow of actions performed by a user of the one or more online applications;
   determining, by the device, that a particular stage of the workflow is associated with a quality of experience metric for the one or more online applications being degraded; and
   providing, by the device, a recommended change in the network for presentation by a user interface that is expected to optimize the quality of experience metric for the one or more online applications.

* * * * *